US006931068B2

(12) United States Patent
Piché et al.

(10) Patent No.: US 6,931,068 B2
(45) Date of Patent: Aug. 16, 2005

(54) THREE-DIMENSIONAL WAVELET-BASED SCALABLE VIDEO COMPRESSION

(75) Inventors: Christopher Piché, West Vancouver (CA); Shahadatullah Khan, North Vancouver (CA); Jozsef Vass, North Vancouver (CA)

(73) Assignee: Eyeball Networks Inc., West Vancouver (CA)

(*) Notice: Subject to any disclaimer, the term of this patent is extended or adjusted under 35 U.S.C. 154(b) by 157 days.

(21) Appl. No.: 10/415,006

(22) PCT Filed: Oct. 24, 2001

(86) PCT No.: PCT/CA01/01518

§ 371 (c)(1),
(2), (4) Date: Apr. 23, 2003

(87) PCT Pub. No.: WO02/35849

PCT Pub. Date: May 2, 2002

(65) Prior Publication Data

US 2004/0028138 A1 Feb. 12, 2004

Related U.S. Application Data

(60) Provisional application No. 60/242,828, filed on Oct. 24, 2000.

(51) Int. Cl.[7] .............................................. H04N 7/12
(52) U.S. Cl. ............. 375/240.19; 375/240; 375/240.01; 375/240.02; 375/240.12; 375/240.19
(58) Field of Search .......................... 375/240.19, 240, 375/240.01, 240.02, 240.12, 240.18; 382/232, 240

(56) References Cited

U.S. PATENT DOCUMENTS 5,412,741 A    5/1995   Shapiro ...................... 382/232
5,748,786 A    5/1998   Zandi et al. ................. 382/240
6,795,504 B1 * 9/2004   Xu et al. ................ 375/240.19
6,850,570 B1 * 2/2005   Pesquet-Popescu et al. ..... 375/240.19

FOREIGN PATENT DOCUMENTS

DE    197 34 542    2/1999
EP    547528        6/1993
EP    1037468       9/2000

OTHER PUBLICATIONS

Patrizio Campisi, Mauro Gentile, and Alessandro Neri, Three Dimensional Wavelet Based Approach for a Scalable Video Conference System, Dipartimento di Ingegneria Elettronica, Universita degli Studi Roma Tre, Roma, Italy.

David Taubman, High Performance Scalable Image Compression with EBCOT, IEEE Transactions on Image Processing, vol. 9, No. 7, Jul. 2000.

(Continued)

Primary Examiner—Allen Wong
(74) Attorney, Agent, or Firm—Fasken Martineau DuMoulin LLP

(57) ABSTRACT

A method of encoding an input video signal for communication over a computer network, the method comprising the steps of: i) applying a three-dimensional wavelet-based temporal and spatial decomposition to produce a plurality of spatio-temporal subbands; ii) quantizing the coefficients of the spatio-temporal subbands with a uniform scalar quantizer to produce a significance map; and iii) run-length and adaptive arithmetic coding of the signal by encoding the significance map, encoding the signs of all significant coefficients, and encoding the magnitudes of significant coefficients, in bit-plane order starting with the most significant bit-plane.

15 Claims, 4 Drawing Sheets

OTHER PUBLICATIONS

Beong–Jo Kim and William A. Pearlman, An Embedded Wavelet Video Coder Using Three–Dimensional Set Partitioning in Hierarchical Trees (SPIHT), Department of Electrical, Computer, and Systems Engineering Rensselaer Polytechnic Institute, Troy, NY.

Leon Bottou, Paul G. Howard, and Yoshua Bengio, The Z–Coder Adaptive Binary Coder, AT&T Labs—Research, Red Bank NJ, University de Montreal, Montreal.

Jozsef Vass and Xinhua Zhuang, Efficient Three–Dimensional Wavelet Codecs for Networked Video Communications, Multimedia Communications and Visualization Laboratory, Department of Computer Engineering & Computer Science University of Missouri–Columbia, Columbia.

D. Wilson, W.L. Pek, and M. Ghanbari, On the Coding of the Enhancement Layer of an MPEG–2 SNR Scalable Coder, University of Essex, Department of Electronic Systems Engineering, Colchester, United Kingdom.

Jozsef Vass, Bing–Bing Chai, Kannappan Palaniappan, and Xinhua Zhuang, Significance–Linked Connected Component Analysis for Very Low Bit–Rate Wavelet Video Coding, IEEE Transactions on Circuits and Systems for Video Technology, vol. 9. No. 4. Jun. 1999.

* cited by examiner

FIG. 3 the Internet.

THREE-DIMENSIONAL WAVELET-BASED SCALABLE VIDEO COMPRESSION

This application claims the benefit of priority from U.S. Provisional Patent Application No. 60/242,828 filed Oct. 24, 2000.

TECHNICAL FIELD

This invention relates generally to multimedia communications and more particular to methods and systems for the compression/decompression and encoding/decoding of video information transmitted over the Internet.

BACKGROUND

With the availability of high-performance personal computers and popularity of broadband Internet connections, the demand for Internet-based video applications such as video conferencing, video messaging, video-on-demand, etc. is rapidly increasing. To reduce transmission and storage costs, improved bit-rate compression/decompression ("codec") systems are needed. Image, video, and audio signals are amenable to compression due to considerable statistical redundancy in the signals. Within a single image or a single video frame, there exists significant correlation among neighboring samples, giving rise to what is generally termed "spatial correlation". Also, in moving images, such as full motion video, there is significant correlation among samples in different segments of time such as successive frames. This correlation is generally referred to as "temporal correlation". There is a need for an improved, cost-effective system and method that uses both spatial and temporal correlation to remove the redundancy in the video to achieve high compression in transmission and to maintain good to excellent image quality, while adapting to change in the available bandwidth of the transmission channel and to the limitations of the receiving resources of the clients.

A known technique for taking advantage of the limited variation between frames of a motion video is known as motion-compensated image coding. In such coding, the current frame is predicted from the previously encoded frame using motion estimation and compensation, and only the difference between the actual current frame and the predicted current frame is coded. By coding only the difference, or residual, rather than the image frame itself, it is possible to improve image quality, for the residual tends to have lower amplitude than the image, and can thus be coded with greater accuracy. Motion estimation and compensation are discussed in Lim, J. S. *Two-Dimensional Signal and Image Processing,* Prentice Hall, pp. 497–507 (1990). However, motion estimation and compensation techniques have high computational cost, prohibiting software-only applications for most personal computers.

Further difficulties arise in the provision of a codec for an Internet streamer in that the bandwidth of the transmission channel is subject to change during transmission, and clients with varying receiver resources may join or leave the network as well during transmission. Internet streaming applications require video encoding technologies with features such as low delay, low complexity, scalable representation, and error resilience for effective video communications. The current standards and the state-of-the-art video coding technologies are proving to be insufficient to provide these features. Some of the developed standards (MPEG-1, MPEG-2) target non-interactive streaming applications. Although H.323 Recommendation targets interactive audiovisual conferencing over unreliable packet networks (such as the Internet), the applied H.26x video codecs do not support all the features demanded by Internet-based applications. Although new standards such as H.263+ and MPEG-4 started to address some of these issues (scalability, error resilience, etc.), the current state of these standards is far from being complete in order to support a wide range of video applications effectively.

Known image compression techniques such as JPEG, MPEG, and P*64 use transform techniques such as discrete cosine transform (DCT) to project the video sample as appropriate basis functions and then encode the resulting coefficients. These transforms are based on transforming a block of video data, such as 8×8 pixels, for JPEG or MPEG and therefore have a block constraint and fail to exploit interblock correlations. The discrete cosine transform or the related Fourier transform work under the assumption that the original time domain signal is periodic in nature. Therefore, it has difficulty with signals having transient components— that is signals that are localized in time; this is especially apparent when a signal has sharp transitions.

To overcome these problems, codecs can instead use basis functions that are localized both in time and frequency called "wavelets". The wavelet representation is very suitable for non-stationary signals such as a sequence of video images having motion. The technique of compression by quantization and encoding the wavelet coefficients relies on the assumption that details at high resolution are less visible to the eye and therefore can be eliminated or reconstructed with lower order precision while still maintaining good to excellent display visual quality. Thus, the wavelet coefficients are coded according to their location in frequency bands and their importance for the quality of the final reconstructed image. U.S. Pat. No. 6,091,777 to Guetz et al. and U.S. Pat. No. 6,272,180 to Lei provide examples of codecs that use wavelet transformations. However, the codecs taught by Guetz et al. and Lei use wavelet transformations in only two dimensions, applied to only one frame at a time.

Due to very heterogeneous networking and computing infrastructure, highly scalable video coding algorithms are required. A video codec should provide reasonable quality to low-performance personal computers connected via a dial-up modem or a wireless connection, and high quality to high-performance computers connected using T1. Thus the compression algorithm is expected to scale well in terms of both computational cost and bandwidth requirement.

Real Time Protocol (RTP) is most commonly used to carry time-sensitive multimedia traffic over the Internet. Since RTP is built on the unreliable user datagram protocol (UDP), the coding algorithm must be able to effectively handle packet losses. Furthermore, due to low-delay requirements of the interactive applications and multicast transmission requirements, the popular retransmission method widely deployed over the Internet cannot be used. Thus the video codec should provide high degree of resilience against network and transmission errors in order to minimize impact on visual quality.

Computational complexity of the encoding and decoding process must be low in order to provide reasonable frame rate and quality on low-performance computers (PDAs, hand-held computers, etc.) and high frame-rate and quality on average personal computers. As mentioned, the popularly applied motion estimation and motion compensation techniques have high computational cost prohibiting software-only applications for most personal computers.

SUMMARY OF INVENTION

This invention provides a new method for encoding and decoding of video signals based on wavelet-based techniques. As mentioned, wavelet-based video coding provides an excellent alternative to the standard video codecs (H.26x, MPEG-1, MPEG-2, etc.), which utilize block-based motion estimation/compensation and discrete cosine transform (DCT). Temporal filtering has significantly lower computational cost than motion estimation and motion compensation. In addition, it also provides high resilience against transmission and network errors and packet losses. The multi-resolution wavelet transformation naturally provides scalable video representation. As a result, the use of wavelet-based temporal transformation as part of the method of the invention is an excellent choice for Internet video transmission providing scalability, error resilience, and low computational complexity.

The present invention uses a three-dimensional wavelet decomposition technique that involves a unique mixture of spatial and temporal wavelet/subband decomposition performed on a group of frames. Further, the present invention provides an improved method of video encoding by using significance mapping and bitstream layering of coefficients derived from spatio-temporal transform operations performed on original frames. A group of four frames is decomposed using both temporal and spatial wavelet decomposition techniques. After decomposition, all wavelet coefficients are quantized into significant (one) or non-significant (zero) values. A significance map for each group of frames is generated. The significance maps are rearranged in a process of bitstream layering whereby new maps are generated in order of coefficient significance. The resulting bit-plane maps are encoded using both run-length and adaptive arithmetic coding. Since a large portion of wavelet coefficient is insignificant, only runs of zero coefficients in the bit-planes are used. The run-length codewords are encoded by selecting a probability model.

BRIEF DESCRIPTION OF DRAWINGS

In Figures which illustrate non-limiting embodiments of the invention:

FIG. 3 is a pictorial representation illustrating the resulting spatio-temporal subbands for 3-D wavelet decomposition on four frames.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

Figure 1:
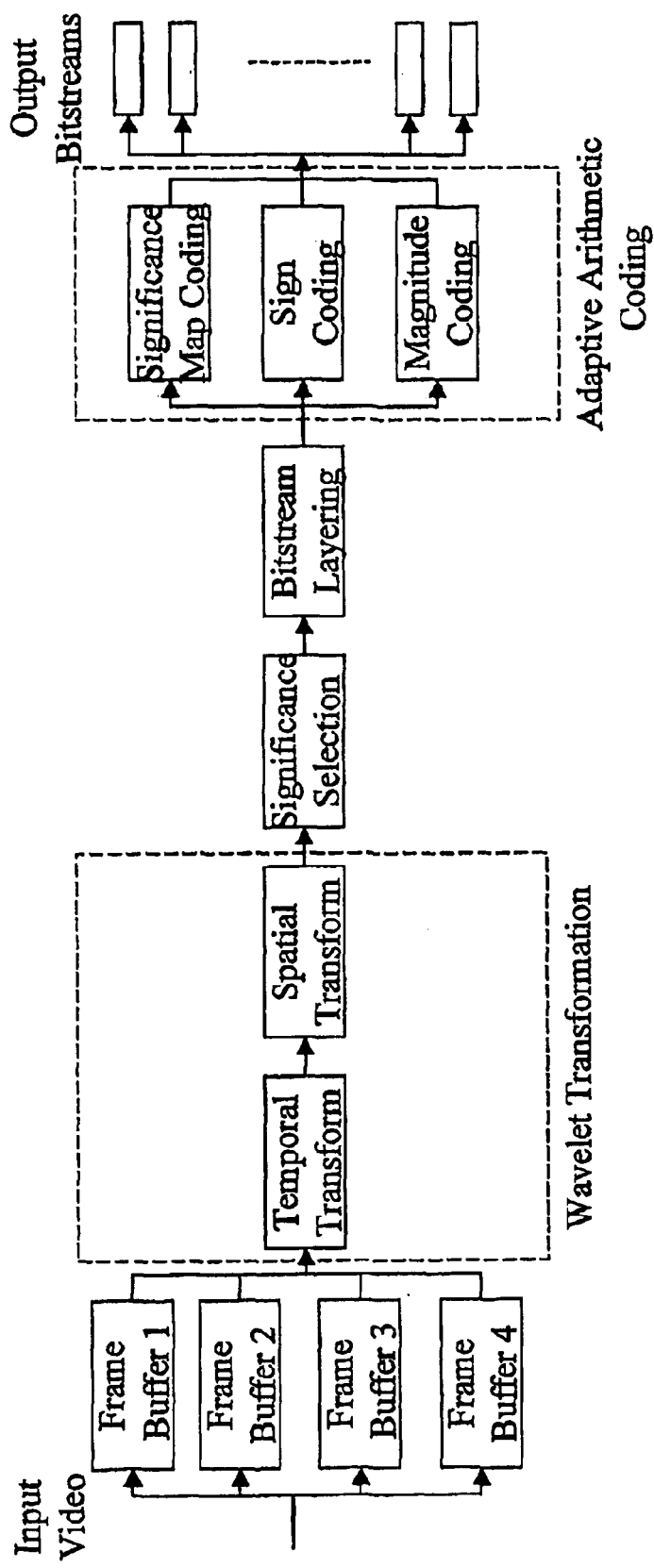
FIG. 1 is a functional block diagram of the encoder of a codec operated in accordance with a preferred embodiment of the invention.

FIG. 1 depicts a functional block diagram of the encoder of a codec according to a preferred embodiment of the invention. The encoding process consists of the following steps:

Three-dimensional (3-D) wavelet decomposition;

Wavelet coefficient partitioning;

Bitstream layering;

Run-length and adaptive arithmetic coding.

Each of these steps will be explained in detail below. This process can be implemented using software alone, if desired.

Three-Dimensional Wavelet Decomposition

Figure 2:
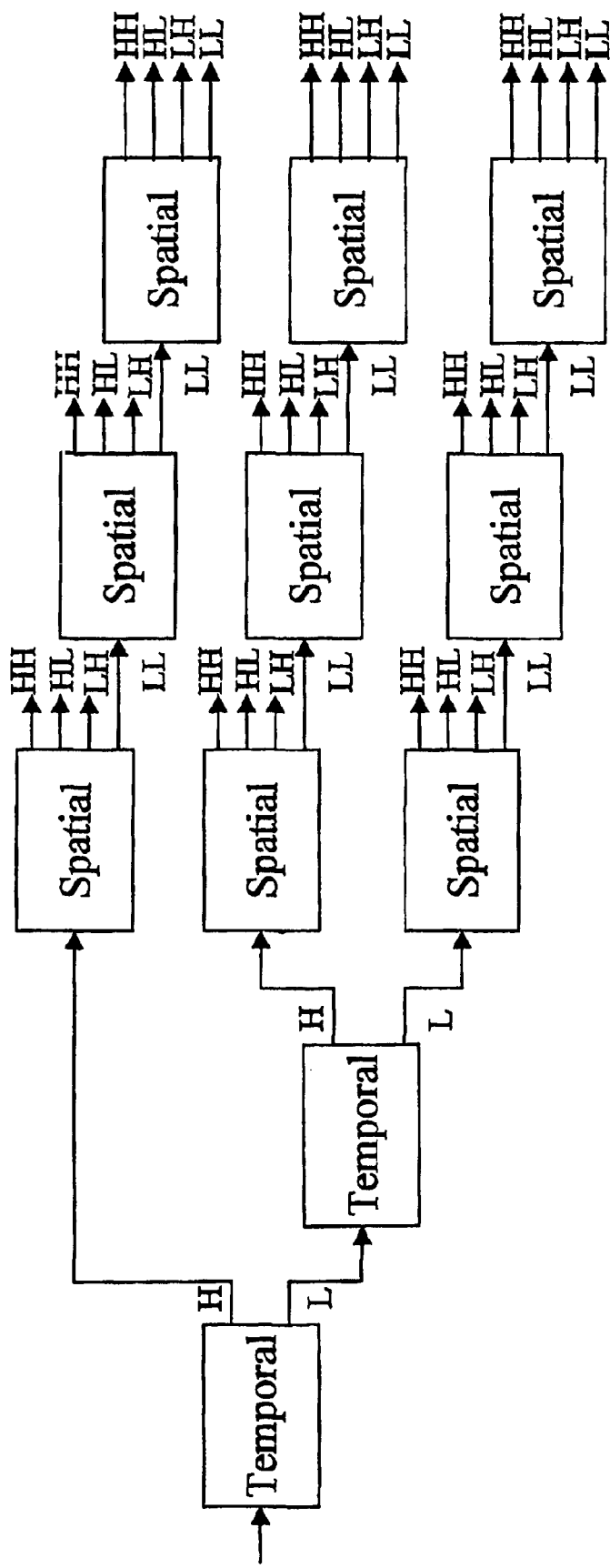
FIG. 2 is a functional block diagram of 3-D subband decomposition according to the invention.
Figure 3:
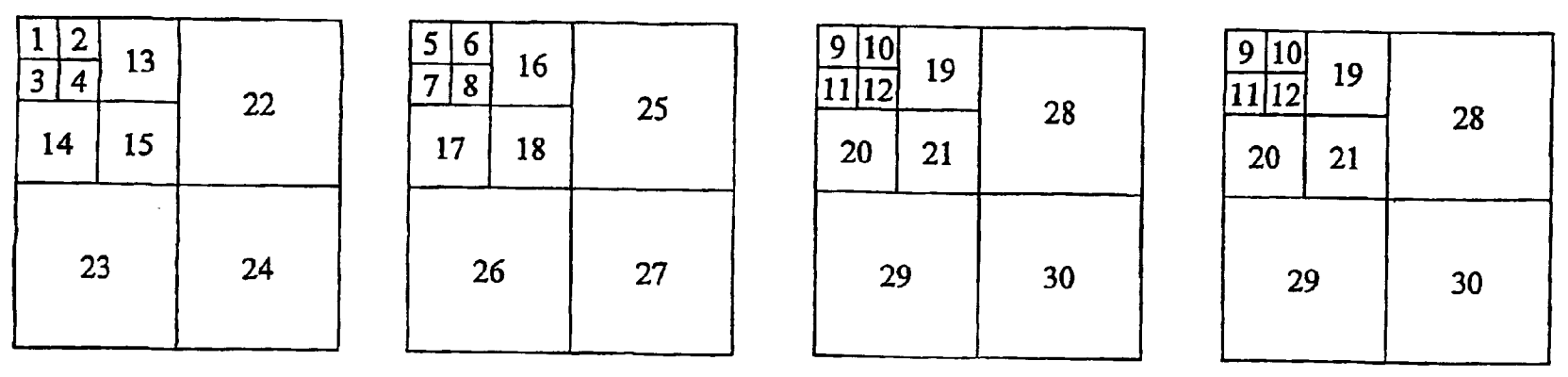

FIG. 2 is a functional block diagram illustrating the applied three-dimensional wavelet-based subband decomposition method according to an embodiment of the present invention. In this embodiment, four frames constitute a group of frames ("GOF"). First, a two-level temporal decomposition is applied, resulting in three temporal subbands. Then, spatial decomposition is separately applied for each temporal subband. Two-level temporal decomposition followed by three-level spatial decomposition on four input frames results in 30 spatio-temporal subbands as shown in FIG. 3. In this embodiment, the Haar wavelet is used for temporal decomposition and the Daubechies 9/7 filter is used for spatial decomposition.

Wavelet Coefficients Partitioning

After wavelet decomposition, all the wavelet coefficients are quantized with the same uniform scalar quantizer. Wavelet coefficients that are quantized to nonzero are termed significant coefficients. Wavelet coefficients that are quantized to zero are termed insignificant coefficients. Thus the quantization procedure determines a map of significant coefficients which can be described as a significance map. The significance map is a binary image of size equal to that of the original image. Binary "0" means that the wavelet coefficient at the corresponding location is insignificant and binary "1" means that the wavelet coefficient at the corresponding location is significant.

Bitstream Layering

One of the key features of a codec according to the present invention is its scalability in multiple dimensions. In the embodiment illustrated in the drawings, it provides three levels of temporal scalability and three levels of spatial scalability (as discussed below). Furthermore, SNR scalability is also supported by encoding magnitudes of significant coefficients in bit-plane order starting with the most significant bit-plane.

As mentioned, a codec according to the presently-discussed embodiment of the invention provides three levels of temporal scalability. Take, for example, a video sequence encoded at 30 frames/second. The receiver is able to decode the video at 30 frames/second, 15 frames/second, or 7.5 frames/second. A codec according to the present invention also supports three levels of spatial scalability. This means that if the original video is encoded at 352×288 pixel resolution, then it can be decoded at full spatial resolution (352×288 pixels), half spatial resolution (176×144 pixels), or quarter spatial resolution (88×72 pixels). Table I shows the subbands of FIG. 3 to be used obtain different levels of temporal and spatial resolution. At each level in Table I, the additional subbands from the previous level is shown in bold-face.

TABLE I

Required subbands for each given spatio-termporal resolution.
The additional subbands required to obtain a higher
spatial/temporal resolution from a previous level are highlighted

| Temporal | Spatial | Required Subbands |
|---|---|---|
| Quarter | Quarter | 1, 2, 3, 4, |
| Quarter | Half | 1, 2, 3, 4, 13, 14, 15 |
| Quarter | Full | 1, 2, 3, 4, 13, 14, 15, 22, 23, 24 |
| Half | Quarter | 1, 2, 3, 4, 5, 6, 7, 8 |
| Half | Half | 1, 2, 3, 4, 5, 6, 7, 8, 13, 14, 15, 16, 17, 18 |
| Half | Full | 1, 2, 3, 4, 5, 6, 7, 8, 13, 14, 15, 16, 17, 18, 22, 23, 24, 25, 26, 27 |
| Full | Quarter | 1, 2, 3, 4, 5, 6, 7, 8, 9, 10, 11, 12 |
| Full | Half | 1, 2, 3, 4, 5, 6, 7, 8, 9, 10, 11, 12, 13, 14, 15, 16, 17, 18, 19, 20, 21 |

TABLE I-continued

Required subbands for each given spatio-termporal resolution.
The additional subbands required to obtain a higher
spatial/temporal resolution from a previous level are highlighted

| Temporal | Spatial | Required Subbands |
|---|---|---|
| Full | Full | 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 |

In addition to temporal and spatial scalability, SNR scalability is also supported by transmitting significant coefficients in bit-plane order starting from the most significant bit.

Run-length and Adaptive Arithmetic Coding

A novel combination of run-length and arithmetic coding (RLAC) is used. Coding progresses in three stages. First, the significance map is encoded. Second, the signs of all significant coefficients need to be encoded. Finally, magnitudes of significant coefficients are encoded.

The significance information of all the wavelet coefficients needs to be encoded. The frames are scanned in subband order (LL, LH, HL, and HH) from coarse to fine resolution. Within each subband, the coefficients are scanned from top to bottom, left to right. It is observed that a large percentage (about 80%) of the wavelet coefficients is insignificant. The large number of zero coefficients can be efficiently encoded by run-length coding. Finally, adaptive arithmetic coding is used to encode the resulting run-length codewords. The main features of the invented run-length and arithmetic coding (RLAC) technique include the following:

Since a large portion of wavelet coefficients is insignificant, only zero runs are used for run-length coding. Using both zero runs and one runs provides marginal performance gain, which is not justified by the increased encoder/decoder complexity.

The maximum run-length can be at most one image line long, and it is adjusted to the image width.

The run-length codewords are directly encoded by using an N-ary adaptive arithmetic codec, where N is the maximum run-length.

The current run-length codeword is encoded by selecting one of five possible probability models (each a "context"). The previous run-length codeword (which is available at both the encoder and decoder) is used to select the probability model that is used to encode the current run-length codeword.

The signs of significant coefficients are encoded using binary adaptive arithmetic coding. POS and NEG symbols denote positive and negative significant wavelet coefficients, respectively. During adaptive arithmetic coding, each pixel may be coded assuming a different probability model (context). The context is determined by the number of significant coefficients in pixels neighboring the pixel to be encoded, such as in the small spatial neighborhood illustrated in FIG. 4. This context is calculated from the already transmitted significance map. In the present embodiment of the invention, a total of five models are used. (0 significant, 1 significant, . . . , 4 significant).

Figure 4:
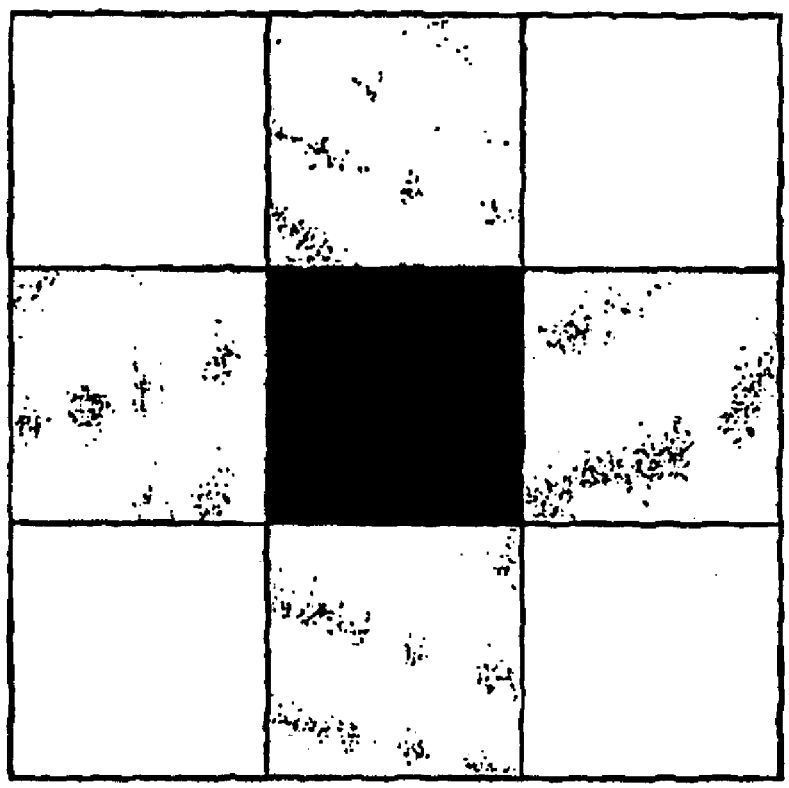
FIG. 4 is a pictorial representation illustrating a probability model for coding/transmitting the sign and magnitude of significant wavelet coefficients.

Magnitudes of significant wavelet coefficients are encoded in bit-plane order. Again, a binary adaptive arithmetic codec is used to encode each bit-plane. As with the sign of significant coefficients, the context is determined by the number of significant wavelet coefficients in a small neighborhood as shown in FIG. 4. The encoding order proceeds from the most significant bit-plane to the least significant bit-plane providing SNR scalability.

A video codec according to the present invention provides the following highly desirable features:

Scalable coding: The codec provides temporal, resolution, and SNR scalability. Temporal scalability is implemented by decoding a subset of the temporal subbands. Resolution scalability is obtained by decoding a subset of the spatial subbands. SNR scalability is achieved by encoding bit-planes in order of importance. This enables a distributed video application such as video conferencing or video streaming to dynamically adjust video resolution, frame rate, and picture quality of the received video depending on the available network bandwidth and hardware capabilities of the receiver. Receivers with high bandwidth network connections and high-performance computers may receive high quality color video at high frame rate while receivers with low bandwidth connections and low-performance computers may receive lower quality video at a lower frame rate.

Low computational complexity: The encoder and decoder of the codec have low and symmetric computational complexity. Since the codec does not use the highly complex motion estimation and compensation techniques, the encoding process is observed to be an order faster than the encoding process of standard-based codecs such as H.26x and MPEG. The most computational expensive parts of a codec according to the present invention (wavelet transformation and inverse wavelet transformation) are implemented in MMX. As a result, this codex provides about 50 frames/second when both the encoder and decoder are executed on a 667 MHz Pentium III computer running Windows 2000.

Error resilience: The bitstream of the codec provides a high degree of error resilience for networks with packet loss such as the Internet. The undesirable temporal and spatial error propagation of block-based hybrid discrete cosine transform (DCT) codecs (H.26x, MPEG, etc.) is largely prevented in this codec. The spatial error propagation is significantly reduced due to the lack of motion estimation and motion compensation. The temporal error propagation is limited to the GOF size of four frames.

High coding performance: High coding performance is needed in order to provide users with high video quality over low bandwidth network connections. A more efficient compression technique means that users receive higher picture quality with the same transmission time, or the same video quality with shorter download time. It is observed that a codec according to the present invention provides excellent coding performance and the performance numbers suggest that it is one of the best performance wavelet codecs reported in the literature.

As will be apparent to those skilled in the art in the light of the foregoing disclosure, many alterations and modifications are possible in the practice of this invention without departing from the scope thereof. Accordingly, the scope of the invention is to be construed in accordance with the substance defined by the following claims.

What is claimed is:

1. A method of encoding an input video signal comprising a group of video frames for communication over a computer network, the method comprising the steps of:
   i) applying a two-level temporal decomposition using a wavelet to said group of frames to produce a plurality of temporal subbands;
   ii) applying a spatial decomposition to each said temporal subband to produce a plurality of spatio-temporal subbands;

iii) quantizing the coefficients of said spatio-temporal subbands with a uniform scalar quantizer to produce a significance map; and
iv) run-length and adaptive arithmetic coding of said signal by
   a) encoding the significance map through a combination of run-length and adaptive arithmetic coding by:
      A) coding run-length codewords using N-ary adaptive arithmetic coding, where N is the maximum run-length previously observed in coding the significance map; and
      B) encoding the current run-length codeword using one of a specified plurality of probability models, the probability model being selected by a rule which selects a probability model according to the previous run-length codeword;
   b) encoding the signs of all significant coefficients using the number of significant coefficients in a four pixel neighborhood as context; and
   c) encoding the magnitudes of significant coefficients, in bit-plane order starting with the most significant bit-plane, using the number of significant coefficients in a four pixel neighborhood as context.

2. The method of claim 1 wherein, in step iv) a) B., the number of said probability models is five.

3. The method of claim 1 wherein said group of frames comprises four frames.

4. The method of claim 1 wherein the Haar wavelet is used for temporal decomposition.

5. The method of claim 1 wherein the Daubechies 9/7 filter is used for spatial decomposition.

6. A computer program product for encoding an input video signal comprising a group of video frames for communication over a computer network, said computer program product comprising:
   i) a computer usable medium having computer readable program code means embodied in said medium for:
      a) applying a two-level temporal decomposition using a wavelet to said group of frames to produce a plurality of temporal subbands;
      b) applying a spatial decomposition to each said temporal subband to produce a plurality of spatio-temporal subbands;
      c) quantizing the coefficients of said spatio-temporal subbands with a uniform scalar quantizer to produce a significance map; and
      d) run-length and adaptive arithmetic coding of said signal by
         A) encoding the significance map through a combination of run-length and adaptive arithmetic coding by:
            i) coding run-length codewords using N-ary adaptive arithmetic coding, where N is the maximum run-length previously observed in coding the significance map; and
            ii) encoding the current run-length codeword using one of a specified plurality of probability models, the probability model being selected by a rule which selects a probability model according to the previous run-length codeword;
         B) ending the signs of all significant coefficients using the number of significant coefficients in a four pixel neighborhood as context; and
         C) encoding the magnitudes of significant coefficients, in bit-plane order starting with the most significant bit-plane, using the number of significant coefficients in a four pixel neighborhood as context.

7. The computer program product of claim 6 wherein the number of said probability models is five.

8. The computer program product of claim 6 wherein said group of frames comprises four frames.

9. The computer program product of claim 6 wherein the Haar wavelet is used for temporal decomposition.

10. The computer program product of claim 6 wherein the Daubechies 9/7 filter is used for spatial decomposition.

11. An article comprising:
   i) a computer readable modulated carrier signal;
   ii) means embedded in said signal for encoding an input video signal comprising a group of video frames for communication over a computer network, said means comprising means for:
      a) applying a two-level temporal decomposition using a wavelet to said group of frames to produce a plurality of temporal subbands;
      b) applying a spatial decomposition to each said temporal subband to produce a plurality of spatio-temporal subbands;
      c) quantizing the coefficients of said spatio-temporal subbands with a uniform scalar quantizer to produce a significance map; and
      d) run-length and adaptive arithmetic coding of said signal by:
         A) encoding the significance map:
            i) coding run-length codewords using N-ary adaptive arithmetic coding, where N is the maximum run-length previously observed in coding the significance map; and
            ii) encoding the current run-length codeword using one of a specified plurality of probability models, the probability model being selected by a rule which selects a probability model according to the previous run-length codeword;
         B) ending the signs of all significant coefficients using the number of significant coefficients in a four pixel neighborhood as context; and
         C) encoding the magnitudes of significant coefficients, in bit-plane order starting with the most significant bit-plane, using the number of significant coefficients in a four pixel neighborhood as context.

12. The article of claim 11 wherein the number of said probability models is five.

13. The article of claim 11 wherein said group of frames comprises four frames.

14. The article of claim 11 wherein the Haar wavelet is used for temporal decomposition.

15. The article of claim 11 wherein the Daubechies 9/7 filter is used for spatial decomposition.

* * * * *